No. 742,209. PATENTED OCT. 27, 1903.
E. J. MOORE.
FRICTION CLUTCH.
APPLICATION FILED SEPT. 29, 1902.
NO MODEL.
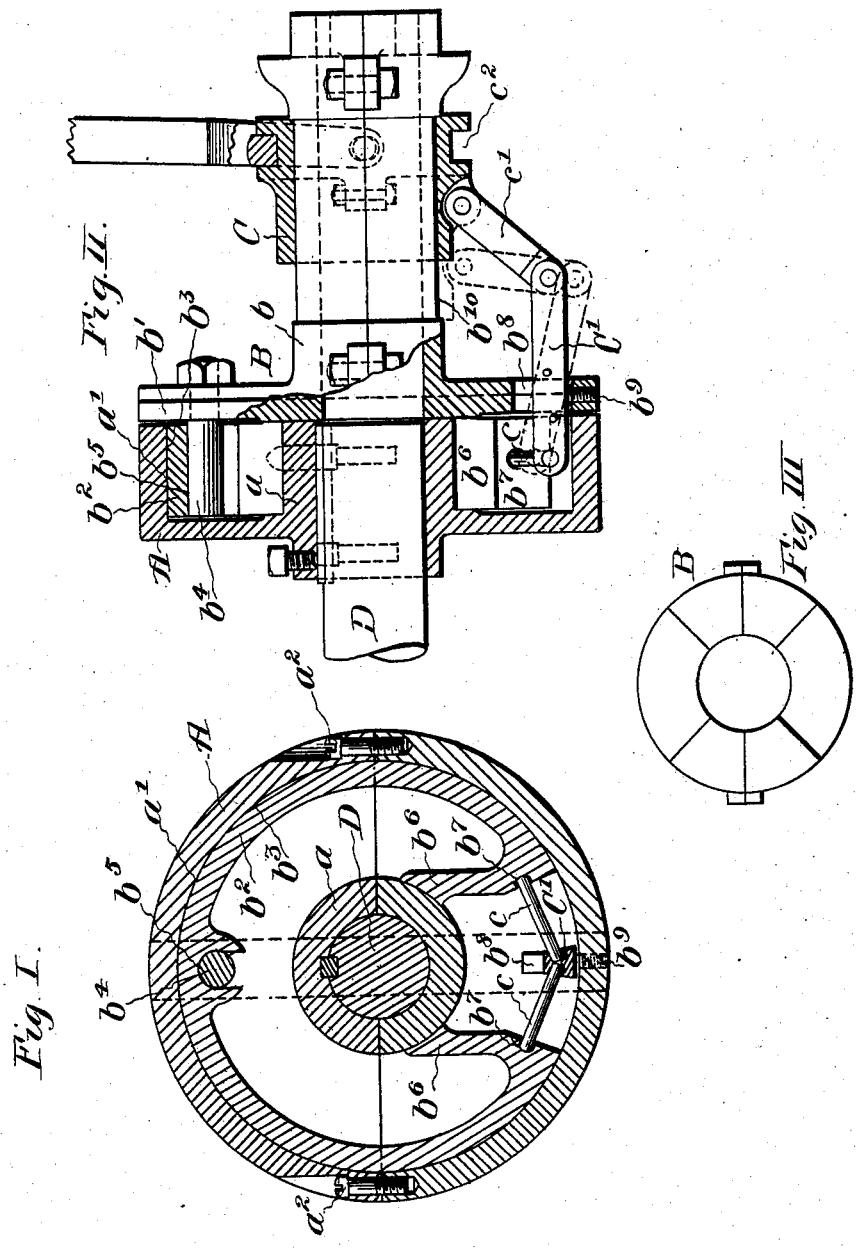
WITNESSES:
Geo. W. Saywell
A. E. Merkel.
INVENTOR.
E. J. Moore
BY
J. D. Fay
ATTORNEY.

UNITED STATES PATENT OFFICE.

EDWARD J. MOORE, OF CLEVELAND, OHIO, ASSIGNOR OF ONE-HALF TO THE SHERWIN-WILLIAMS COMPANY, OF CLEVELAND, OHIO, A CORPORATION OF OHIO.

FRICTION-CLUTCH.

SPECIFICATION forming part of Letters Patent No. 742,209, dated October 27, 1903.

Application filed September 29, 1902. Serial No. 125,206. (No model.)

*To all whom it may concern:*

Be it known that I, EDWARD J. MOORE, a citizen of the United States, and a resident of Cleveland, county of Cuyahoga, and State of Ohio, have invented a new and useful Improvement in Friction-Clutches, of which the following is a specification, the principle of the invention being herein explained and the best mode in which I have contemplated applying that principle, so as to distinguish it from other inventions.

My invention relates to friction-clutches for connecting and disconnecting two rotatable elements, its object being to provide a clutch of such character economical in construction and operation.

Said invention consists of means hereinafter fully described, and specifically set forth in the claims.

The annexed drawings and the following description set forth in detail certain mechanism embodying the invention, such disclosed means constituting but one of the various mechanical forms in which the principle of the invention may be used.

In said annexed drawings, Figure I represents a vertical transverse section of a clutch embodying my invention. Fig. II represents a partial axial section and front elevation of such clutch, and Fig. III represents a view of one end of one of the clutch elements.

The device embodies three main parts—the outer clutch member or drum A, the inner clutch member or expansible member B, and the sliding operating-sleeve C, with its connections. The outer member A is formed with an interior hub $a$ and an inner cylindrical friction-surface $a'$ and is preferably made in two parts, secured by suitable screws $a^2$ $a^2$, so as to be readily split for the purpose of assembling. The driving-shaft D is secured at its extremity to the hub $a$ by means of a groove and a key, as indicated in the drawings. The expansible or inner member B consists of a hub $b$, a disk or flange $b'$, preferably formed integral therewith, and an expansible ring $b^2$, secured to the disk, as will hereinafter appear. The hub and disk are also split into two parts, secured to each other by means of suitable bolts or screws.

The ring $b^2$ has a section removed, as shown in Fig. I, and is of a diameter such that it normally fits snugly yet loosely in the interior of member A, its outer surface $b^3$ being cylindrical and forming a friction-surface. The said ring is rotatively secured to the disk $b'$ by means of a stud $b^4$, secured to the latter and passing into an elongated slot $b^5$, formed in the ring, and is further formed with two centering inwardly-extending feet $b^6$ $b^6$, each provided with a cylindrical bearing-surface resting upon the hub $a$, as shown in Fig. I. Said slot extends in a radial direction and is preferably open at its inner end, as shown. This slot permits of a free outward movement of the ring, the purpose of which will be hereinafter explained. As will be readily seen, the removal of a section of the said ring renders it expansible. It is thus seen that a slight expansion of the ring $b^2$ would effect an amount of friction between the two surfaces $a'$ and $b^3$ sufficient to rotatively connect the two elements A and B. To effect such expansion, a toggle consisting of two short stiff rods $c$ and $c$ is provided, the outer ends of these rods resting in recesses $b^7 b^7$, formed in the contiguous extremities of the expansible ring $b^2$. The inner ends of these rods rest in apertures formed in the end of a lever $C'$, which passes through an aperture $b^8$, formed in the disk $b'$, and loosely fulcrumed upon an adjusting-screw $b^9$ in said disk. The two rods normally form an angle with each other, as shown. The outer end of said lever $C'$ is joined with a link $c'$, which is oscillatory, secured to the operating-sleeve C. This sleeve is mounted, as shown, upon a slide-bearing $b^{10}$, formed upon the hub $b$, and is capable of being reciprocated on such bearing. The normal position of such sleeve is that shown in Fig. II, in which the toggle is in a position such as to allow the expansible ring to lie loosely in the drum. The sleeve is provided with an annular bearing-groove $c^2$, in which is seated a collar operated by a suitable lever, by means of which the sleeve may be reciprocated while being rotated, as will be readily understood.

The position of the parts being that shown in Fig. II, rotation of the member A may be effected without rotation of member B. If it is desired to rotate member B along with member A, the operating-lever is actuated to throw the sleeve over to the left, as illustrated, thereby moving the end of lever C' toward the axis of rotation, and so spreading the contiguous ring ends apart and expanding the ring. The friction so created fixes the two elements relatively to each other, and rotation of member B is so effected.

By means of the adjusting-screw $b^9$ the angle of the two toggle-rods $c$ $c$ may be changed by turning same, thereby varying their field of operation to secure a position which will be exactly that required to effect the proper coöperation of the parts. Such adjustment, since the screw $b^9$ is mounted in the driven member B, may hence be effected without stopping the rotation of the driving member A, thus materially simplifying the manipulation of the adjusting feature of the clutch. Wearing of the two friction-surfaces of an extent such as to interfere with the proper operation may be compensated for by means of such described adjustable construction. The ring $b^2$ being free to move outwardly as a result of the elongation of slot $b^5$, any wear immediately adjacent to such slot is compensated for by such freedom of movement. The wear upon the bearing-surfaces of the feet $b^6$ is comparatively small, so that these feet practically maintain a continued centrality on the part of the ring. The wear of the entire friction-surface $b^3$ is thus rendered practically uniform.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. In a friction-clutch, the combination with an outer member provided with an inwardly-extending hub, of an inner expansible member bearing upon said hub, and adapted to engage said outer member.

2. In a friction-clutch, the combination with an outer member, of an inner expansible member loosely mounted so as to be capable of free outward movement and provided with centering members engaging said outer member.

3. In a friction-clutch, the combination with an outer member provided with an inwardly-extending hub, of an inner expansible member provided with centering-feet engaging said hub.

4. In a friction-clutch, the combination with an outer member provided with an inwardly-extending hub, of an inner expansible member loosely mounted so as to be capable of free outward movement and provided with centering-feet engaging said hub.

Signed by me this 22d day of September, 1902.

EDWARD J. MOORE.

Attest:
J. C. BEARDSLEE,
A. E. MERKEL.